(12) United States Patent
Malik et al.

(10) Patent No.: US 7,370,278 B2
(45) Date of Patent: May 6, 2008

(54) REDIRECTION OF USER-INITIATED DISTINCTIVE PRESENCE ALERT MESSAGES

(75) Inventors: Dale W. Malik, Dunwoody, GA (US); Robert A. Koch, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 47 days.

(21) Appl. No.: 10/985,361

(22) Filed: Nov. 10, 2004

(65) Prior Publication Data

US 2005/0097473 A1  May 5, 2005

Related U.S. Application Data

(63) Continuation-in-part of application No. 10/223,859, filed on Aug. 19, 2002.

(51) Int. Cl.
G06F 3/00  (2006.01)

(52) U.S. Cl. ................ 715/758; 715/753

(58) Field of Classification Search .......... 715/752, 715/753, 758
See application file for complete search history.

(56) References Cited

U.S. PATENT DOCUMENTS

| | | | |
|---|---|---|---|
| 5,675,733 A | 10/1997 | Williams | |
| 5,720,771 A | 2/1998 | Snell | 607/60 |
| 5,793,365 A * | 8/1998 | Tang et al. | 715/758 |
| 5,796,393 A | 8/1998 | MacNaughton et al. | 345/329 |
| 5,812,639 A | 9/1998 | Bartholomew et al. | |
| 5,926,179 A | 7/1999 | Matsuda et al. | 345/355 |
| 6,047,327 A | 4/2000 | Tso et al. | |
| 6,058,420 A | 5/2000 | Davies | 709/224 |
| 6,108,709 A * | 8/2000 | Shinomura et al. | 709/239 |
| 6,151,507 A | 11/2000 | Laiho et al. | |
| 6,286,033 B1 | 9/2001 | Kishinsky et al. | |
| 6,301,609 B1 | 10/2001 | Aravamudan et al. | |
| 6,425,006 B1 | 7/2002 | Chari et al. | 709/224 |
| 6,553,416 B1 | 4/2003 | Chari et al. | 709/224 |
| 6,584,494 B1 | 6/2003 | Manabe et al. | |

(Continued)

FOREIGN PATENT DOCUMENTS

WO   WO 03/098449   11/2003

(Continued)

OTHER PUBLICATIONS

Definition of "Ack", Newton's Telecom Dictionary, CMP books, 20th edition p. 42, Feb. 1, 2004.

(Continued)

*Primary Examiner*—Weilun Lo
*Assistant Examiner*—Truc T. Chuong
(74) *Attorney, Agent, or Firm*—Thomas, Kayden, Horstemeyer & Risley, LLP

(57) ABSTRACT

Presence information of a first user in a messaging system, such as an instant messaging system, is relayed to a second user. A first communications client of a first user detects a change in the presence status of a first user and sends an alert message to a second communications client of a second user. Moreover, systems and methods are provided for sending the alert message to an alternate address, including alternate instant messaging (IM) addresses, e-mail address, or telephone numbers, in the event that the intended recipient of the alert message is not accessible at his or her original IM address.

20 Claims, 7 Drawing Sheets

U.S. PATENT DOCUMENTS

| | | | |
|---|---|---|---|
| 6,591,094 B1 | 7/2003 | Bentley | 455/405 |
| 6,658,095 B1 | 12/2003 | Yoakum et al. | |
| 6,668,169 B2 | 12/2003 | Burgan et al. | |
| 6,727,811 B1 | 4/2004 | Fendis | 340/506 |
| 6,731,308 B1 | 5/2004 | Tang et al. | |
| 6,757,365 B1 | 6/2004 | Bogard | |
| 6,816,578 B1 | 11/2004 | Kredo et al. | |
| 6,944,555 B2 | 9/2005 | Blackett et al. | |
| 6,954,136 B2 | 10/2005 | Sauer | |
| 6,965,935 B2 | 11/2005 | Diong | |
| 6,987,840 B1 | 1/2006 | Bosik et al. | |
| 6,993,327 B2 | 1/2006 | Mathis | |
| 7,043,530 B2 | 5/2006 | Isaacs et al. | |
| 7,058,036 B1 | 6/2006 | Yu et al. | |
| 2002/0026483 A1 | 2/2002 | Isaacs et al. | |
| 2002/0032740 A1* | 3/2002 | Stern et al. | 709/206 |
| 2002/0035605 A1 | 3/2002 | McDowell et al. | |
| 2002/0046299 A1 | 4/2002 | Lefeber et al. | |
| 2002/0160757 A1* | 10/2002 | Shavit et al. | 455/414 |
| 2003/0018903 A1 | 1/2003 | Greca et al. | |
| 2004/0171396 A1 | 9/2004 | Carey et al. | |

FOREIGN PATENT DOCUMENTS

| | | |
|---|---|---|
| WO | WO 03/100637 | 12/2003 |

OTHER PUBLICATIONS

Malik; U.S. Appl. No. 10/233,859, filed Aug. 19, 2002.
Holt; U.S. Appl. No. 10/144,425, filed May 13, 2002.
Daigle; U.S. Appl. No. 11/304,319, filed Dec. 15, 2005.
Malik; U.S. Appl. No. 10/889,741, filed Jul. 13, 2004.
Adamczyk; U.S. Appl. No. 10/745,199, filed Dec. 23, 2003.
Koch; U.S. Appl. No. 09/709,038, filed Nov. 10, 2000.
Holt; Non- Final Rejection mailed on Aug. 25, 2005; for U.S. Appl. No. 10/144,425, filed on May 13, 2002.
Holt; Final Rejection mailed on Feb. 27, 2006; for U.S. Appl. No. 10/144,425, filed on May 13, 2002.
Holt; Non- Final Rejection mailed on Jul. 14, 2006; for U.S. Appl. No. 10/144,425, filed on May 13, 2002.
Holt; Non- Final Rejection mailed on Jan. 3, 2007; for U.S. Appl. No. 10/144,425, filed on May 13, 2002.
Holt; Final Rejection mailed on Jun. 19, 2007; for U.S. Appl. No. 10/144,425, filed on May 13, 2002.
Koch; Non- Final Rejection mailed on Mar. 3, 2004; for U.S. Appl. No. 09/709,038, filed on Nov. 10, 2000.
Koch; Final Rejection mailed on Sep. 2, 2004; for U.S. Appl. No. 09/709,038, filed on Nov. 10, 2000.
Koch; Non- Final Rejection mailed on Jan. 26, 2005; for U.S. Appl. No. 09/709,038, filed on Nov. 10, 2000.
Koch; Final Rejection mailed on Aug. 12, 2005; for U.S. Appl. No. 09/709,038, filed on Nov. 10, 2000.
Koch; Non- Final Rejection mailed on Apr. 28, 2006; for U.S. Appl. No. 09/709,038, filed on Nov. 10, 2000.
Koch; Non- Final Rejection mailed on Jan. 16, 2007; for U.S. Appl. No. 09/709,038, filed on Nov. 10, 2000.
Koch; Examiner Interview Summary Record mailed on Apr. 16, 2007; for U.S. Appl. No. 09/709,038, filed on Nov. 10, 2000.
Koch; Final Rejection mailed on Jul. 6, 2007; for U.S. Appl. No. 09/709,038, filed on Nov. 10, 2000.
Malik; Non- Final Rejection mailed on Sep. 2, 2003; for U.S. Appl. No. 10/233,859, filed on Aug. 19, 2002.
Malik; Examiner Interview Summary Record mailed on Nov. 14, 2003; for U.S. Appl. No. 10/233,859, filed on Aug. 19, 2002.
Malik; Final Rejection mailed on Feb. 24, 2004; for U.S. Appl. No. 10/233,859, filed on Aug. 19, 2002.
Malik; Examiner Interview Summary Record mailed on Apr. 21, 2004; for U.S. Appl. No. 10/233,859, filed on Aug. 19, 2002.
Malik; Advisory Action mailed on Jun. 11, 2004; for U.S. Appl. No. 10/233,859, filed on Aug. 19, 2002.
Malik; Non- Final Rejection mailed on Oct. 20, 2004; for U.S. Appl. No. 10/233,859, filed on Aug. 19, 2002.
Malik; Non- Final Rejection mailed on May 18, 2005; for U.S. Appl. No. 10/233,859, filed on Aug. 19, 2002.
Malik; Final Rejection mailed on Nov. 21, 2005; for U.S. Appl. No. 10/233,859, filed on Aug. 19, 2002.
Malik; Non- Final Rejection mailed on Mar. 13, 2006; for U.S. Appl. No. 10/233,859, filed on Aug. 19, 2002.
Malik; Final Rejection mailed on Sep. 7, 2006; for U.S. Appl. No. 10/233,859, filed on Aug. 19, 2002.
Malik; Non- Final Rejection mailed on Jun. 6, 2007; for U.S. Appl. No. 10/233,859, filed on Aug. 19, 2002.
International Search Report mailed Sep. 12, 2003, for PCT/US03/15814.
International Search Report mailed Jul. 31, 2003, for PCT/US03/14671.
U.S. Appl. No. 09/709,038, filed Nov. 10, 2000; Inventor Robert A. Koch, entitled "Shared Communication Presence Information".
Chuong, Truc T., Non-Final Rejection mailed Jun. 6, 2007, U.S. Appl. No. 10/223,859, filed Aug. 19, 2002.
Chuong, Truc T., Final Rejection mailed Sep. 7, 2006, U.S. Appl. No. 10/223,859, filed Aug. 19, 2002.
Chuong, Truc T., Non-Final Rejection mailed Mar. 13, 2006, U.S. Appl. No. 10/223,859, filed Aug. 19, 2002.
Chuong, Truc T., Final Rejection mailed Nov. 21, 2005, U.S. Appl. No. 10/223,859, filed Aug. 19, 2002.
Chuong, Truc T., Non-Final Rejection mailed May 18, 2005, U.S. Appl. No. 10/223,859, filed Aug. 19, 2002.
Chuong, Truc T., Non-Final Rejection mailed Oct. 20, 2004, U.S. Appl. No. 10/223,859, filed Aug. 19, 2002.
Chuong, Truc T., Advisory Action mailed Jun. 11, 2004, U.S. Appl. No. 10/223,859, filed Aug. 19, 2002.
Chuong, Truc T., Final Rejection mailed Feb. 24, 2004, U.S. Appl. No. 10/223,859, filed Aug. 19, 2002.
Chuong, Truc T., Non-Final Rejection mailed Sep. 2, 2003, U.S. Appl. No. 10/223,859, filed Aug. 19, 2002.

* cited by examiner

REDIRECTION OF USER-INITIATED DISTINCTIVE PRESENCE ALERT MESSAGES

CROSS-REFERENCE TO RELATED APPLICATION

This application is a continuation-in-part of U.S. application Ser. No. 10/223,859, entitled "Caller-Initiated Distinctive Presence Alerting and Auto-Response Messaging," filed Aug. 19, 2002, incorporated herein by reference.

NOTICE OF COPYRIGHT PROTECTION

A portion of the disclosure of this patent document and its figures may contain material subject to copyright protection. The copyright owner has no objection to the facsimile reproduction by anyone of the patent document or the patent disclosure, but otherwise reserves all copyrights whatsoever.

TECHNICAL FIELD

The present disclosure is generally related to communications and, more particularly, is related to a system and method for relaying a user's presence over a communication network.

BACKGROUND

Presence and availability are terms used to describe a present ability of an individual to communicate. Presence is an ability of an individual to communicate in real time, and availability is the willingness of an individual to communicate in real time. In communications, it is advantageous to know whether a potential recipient of a communication message is present and available, i.e., available to receive and respond to the message before initiating the transmission of the message. By making the presence and availability of individual users known before any communication is attempted, a realtime communications environment is facilitated that is more effective and less obtrusive than conventional communication mediums. Clearly, the communication message that is sent to an addressee that is known to be present and available is more likely to be received promptly than a conventional message. For example, often times, conventional telephone calls are forwarded to a person's voicemail and are never returned.

Instant messaging (IM) is one communication medium that employs presence and availability technology. An instant messaging network recognizes when a user is "present" on the network. Accordingly, the network sends notification to other users (usually members of a "buddy list" or "contact list") that are also logged on the network that the user is "present." Further, instant messaging lets a user display custom status messages to his "buddies" online about the user's "availability." For example, a user can specify his availability status as being "busy, not taking messages." Therefore another user on the "buddy list" that is connected to the instant messaging network will be notified that although the user is present on the network, he is not available for receiving messages. Presence and availability information is most useful when an individual shares his or her online status with a trusted group of users. A communication message sent to someone who is readily present and available is less obtrusive, when the addressee has made himself or herself available to the communication.

An example of a traditional "closed" instant messaging (IM) architecture is shown in FIG. 1. The traditional IM architecture consists of a central IM server 105 connected to a number of individual clients (110, 115, 120, 125, 130, 135, 140, and 145) in a closed network. To send an instant message, from client 110 to client 145, IM client 110 first connects with an IM server 105 using a proprietary protocol. For example, AOL® and Yahoo!® use ICQ. Once the IM client 110 is connected to the IM server 105, the user logs on by entering a user name and password. The IM client 110 then sends the IM server 105 the connection information, such as the IP address and the number of the port assigned to the IM client and the name and IP address of everyone in the IM contact list associated with the IM client 110.

The IM server 105 then creates a temporary file that contains the connection information for the IM client 110 and for each IM client 115, 120, 130, 135, 140, 145. Once the temporary files have been created, the IM server 105 checks the network to determine whether any IM client identified by the contact list associated with IM client 110 is currently logged into the system. If the IM server 105 finds any of the contacts logged onto the network, the IM server 105 sends a message back to the IM client 110 with the connection information for each IM client 115, 120, 130, 135, 145 currently logged onto the network. When the IM client 110 receives the connection information, the status of that particular IM client 115, 120, 130, 135, 140, 145 is updated to "Online," which is displayed to the user. At this point the user may select any IM client 115, 120, 130, 135, 140, 145 that is registered "Online," at which point a dialog box will appear in which the user may enter text. Because the IM client 110 knows the address and port number of the IM client 145, the message is sent directly to the recipient IM client 145. The IM client 145 then receives the instant message and can respond. Once the IM session is complete the dialog box is closed and the IM client 110 goes offline and sends a message to the IM server 105 terminating the session. The IM server 105, in response to acknowledging that the IM client 110 has logged off, generates a message to each of the IM clients 115, 120, 130, 135, 140, 145 on the client list of IM client 110 indicating that IM client 110 is logged off the network.

An example of an "open" instant messaging architecture is Jabber, available from Jabber, Inc. of Denver, Colo., which includes an IM system focusing on providing IM access to many types of users from many different locations using many devices and interoperability with IM services. Jabber includes an Extensible Markup Language (XML) open source server software that was developed by a community of developers over the Internet. Jabber allows communication among applications and systems across many platforms. Developers write additional modules to submit them back for possible incorporation into the Jabber software.

A block diagram illustrating a prior art IM network that uses Jabber interoperable XML-based network architecture is shown in FIG. 2. Jabber is a real-time communications platform based on open protocols and Extensive Markup Language (XML) and whose architecture is based on the well-known electronic mail system. Because Jabber is based on the e-mail system, the Jabber architecture contains distributed network servers, called Jabber servers 215-217 and clients, known as Jabber clients 200-205 that receive and send messages to Jabber clients 200-205 connected to any Jabber server 215-217 on the Internet. However, unlike typical e-mail systems, which are store and forward systems, Jabber delivers messages in real time because the Jabber server 215-217 knows when a particular Jabber client 200-205 is online.

The Jabber architecture is based on client-server architecture and not on a client-to-client architecture, as are most IM systems. Messages from Jabber client 200 to Jabber client 201 must pass through the Jabber server 215. Each Jabber client 200-205 is attached to a local Jabber server 215-217. Each local Jabber server 215-217 receives information from one Jabber client 200-205 and transfers the information to another Jabber client 200-205 along with presence information. Each local Jabber server 215-217 functions independently from one another, and can communicate with any other Jabber server 215-217 that is connected to the Internet as long as it has been identified, and predisposed to do so ahead of time. Each local Jabber server 215-217 performs two functions: listening for and communicating directly with Jabber client applications 200-205, and communicating with other Jabber servers 215-217. Each local Jabber server 215-217 consists of multiple components that separately handle individual functions with the Jabber system.

One way that a user can be notified to the online presence or availability of another user through instant messaging is to set up an auditory alert mechanism or "buddy alert." Typically, a user via an IM client will set parameters consisting of the people that the user wants to monitor and what sound the user wants his or her instant messaging client to play when the presence or availability status of a monitored user changes. For example, a user, Dale, may want to be notified when his friend, Lee, is connected to the instant messaging network. Therefore, Dale may designate parameters in his contact list that an auditory alert should be played on Dale's instant messaging client when Lee comes online. In the parameters, Dale can also assign a unique sound to this "buddy" by associating a particular audio file to this alarm request. Accordingly, Dale could assign a particular auditory alert to be played for each "buddy" he monitors. Therefore, when Lee connects to the instant messaging network, an auditory alert will play on Dale's client to notify him of Lee's online presence.

Today's instant messaging services mostly focus on the generation of auditory alerts for a user who is monitoring presence status changes initiated by persons named in the contact list of the user. The monitoring user designates the type of auditory alert played and under what conditions, the auditory alert is played. Such conventional monitoring techniques are not flexible for the user being monitored. For example, conventional monitoring techniques do not enable monitoring of a user at different addresses.

Thus, a heretofore unaddressed need exists in the industry to address the aforementioned deficiencies and inadequacies.

SUMMARY

Exemplary embodiments of the present disclosure provide systems and methods for relaying presence information of a first user to a second user. Briefly described, in architecture, one embodiment of the system, among others, can be implemented as follows. A first communications client of a first user detects a change in the presence status of a first user and sends an alert message to a second communications client of a second user. Moreover, some embodiments provide for sending the alert message to an alternate address, including alternate instant messaging (IM) addresses, e-mail address, or telephone numbers, in the event that the intended recipient of the alert message is not accessible at his or her original messaging address.

The present disclosure can also be viewed as providing methods for relaying presence information of a first user to a second user. In this regard, one embodiment of such a method, among others, can be broadly summarized by the following steps: receiving a message from a first messaging user; sending the message to a second messaging user; and in the absence of an acknowledged receipt of the message, re-sending the message to the second user at least one alternate address.

Further, exemplary embodiments of the present disclosure include methods and systems to ensure that the alert messages are provided with maximum opportunity to be received by the intended recipient. Reception of alert messages by the intended recipient can be problematic since they would normally be received by a messaging client. However, there is no certainty that the intended recipient of the alert message is present on their messaging client when the alert message is sent. Accordingly, the present invention detects non-receipt of an alert message and upon such detection, determines at least one backup alternate address to which to send the alert message. The alternate address(es) may be any address capable of voice or data communications, including email destinations, telephone destinations, or instant messaging destinations.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 3:
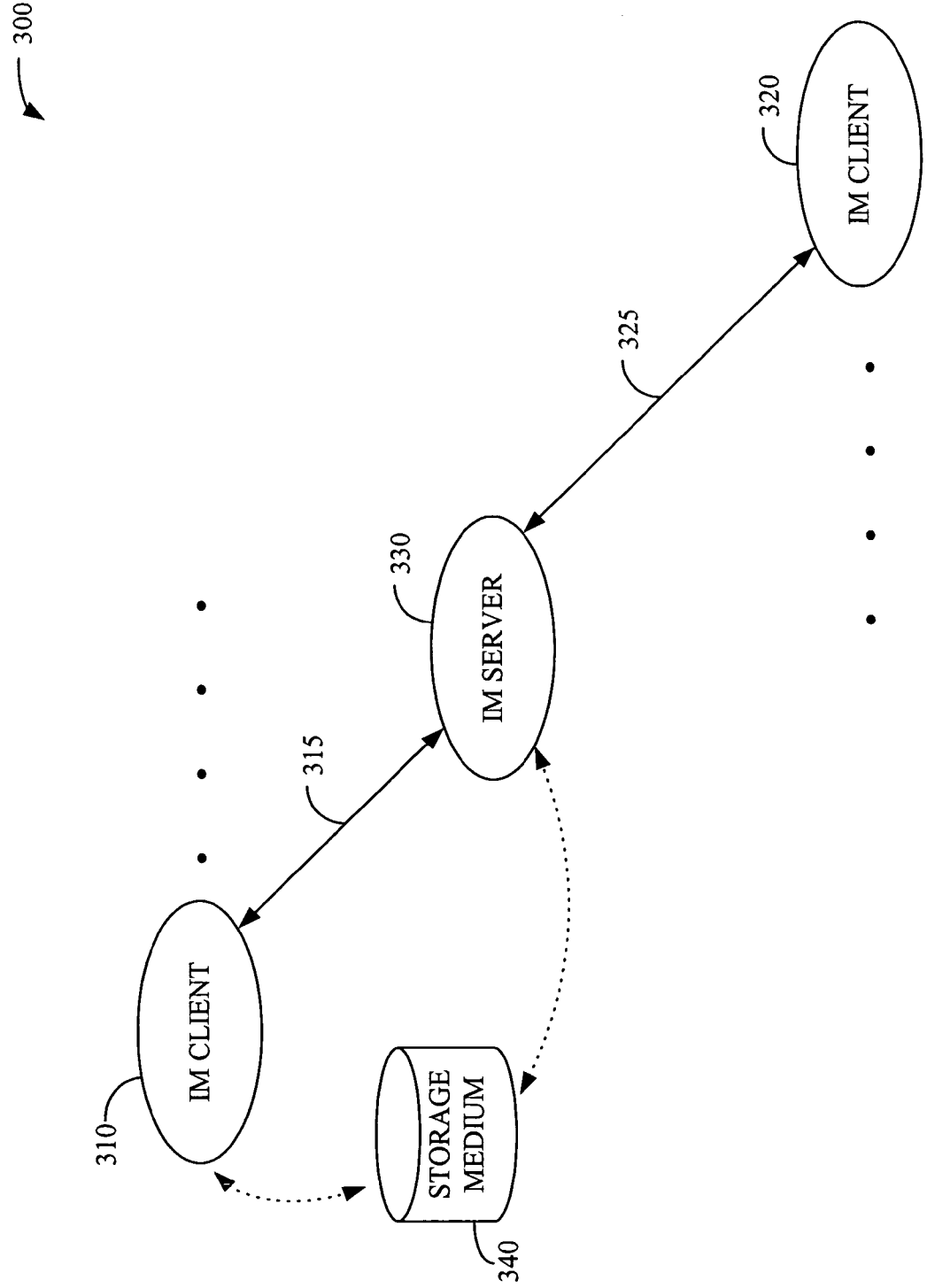
FIG. 3 is a block diagram of a user-initiated alert system according to one exemplary embodiment.

Depicted in FIG. 3 is a representative embodiment, among others, of a user-initiated alert system 300. The user-initiated alert system 300 includes an instant messaging (IM) client 310 of a first user, wherein the IM client 310 is adapted to transmit an alert message when a particular presence status change occurs with regard to the first user. The system also includes an IM client 320 of a second user, wherein the client 320 is adapted to receive and play the alert messages it receives from other users, such as the first user. As described in greater detail hereinafter, the IM client 310 of the first user acquires objective information that is relevant to determining when to send an alert message.

Figure 1:
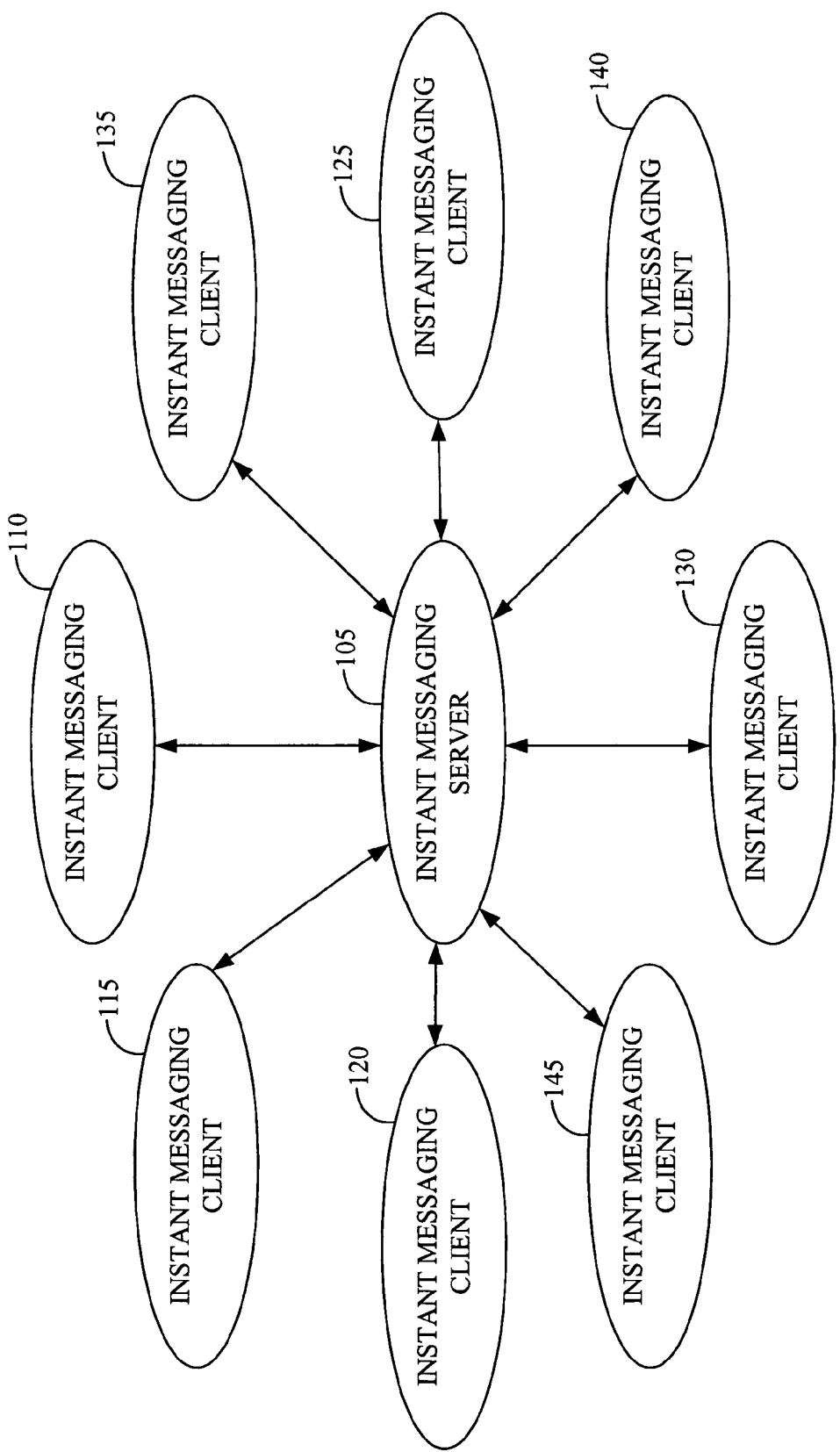
FIG. 1 is a block diagram of a conventional closed instant messaging system.
Figure 2:
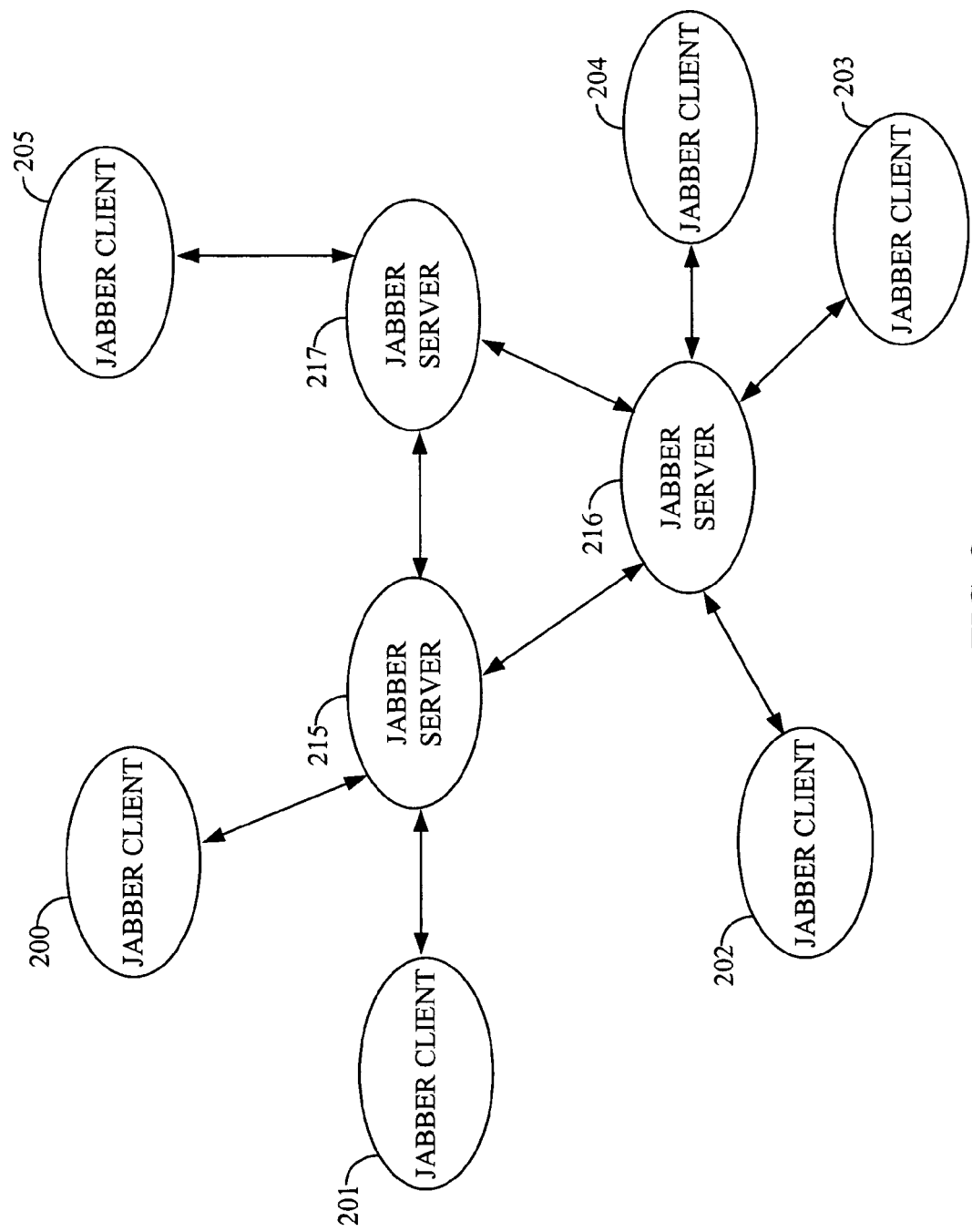
FIG. 2 is a block diagram of a conventional open instant messaging system.

Each IM client 310, 320 communicates with and receives presence status information from an IM server 330. The IM server 330 may be, among others, a single IM server 105 of FIG. 1 or a local IM server, such as a Jabber Server 215 of FIG. 2. The IM server 330 monitors the presence information of the IM client 310 of the first user and notifies the IM client 310 of the presence status information of other IM clients 320 and their associated users. Accordingly, a user sets contact parameters on the type of presence information that the user wants to receive from the IM server 330.

For instance, the first user may designate the contact parameters in a contact list (or buddy list), for example. Within the contact parameters, the first user names the second user as a person that the first user wants to monitor. The contact parameters in the contact list are then stored in a storage medium 340 that is accessible by the IM client 310 of the first user or the IM server 330. Other information may also be contained in the contact parameters such as the instant messaging addresses of the people identified in the contact list.

In a closed system (FIG. 1), the contact parameters are typically stored in a storage medium 340 that is accessible by the IM client 310, 320, such as an internal disk drive of a general purpose computer or the memory of a mobile device, and a copy of the contact parameters is given to the IM server 330.

In an open system (FIG. 2), the contact parameters are typically stored in a storage medium 340 accessible by the IM server 330, such as an internal disk drive or a separate storage medium, such as a database. The IM server 330 then forwards a copy of the contact parameters to the IM client 310. From the contact parameters, the IM client 310 identifies the people about which the first user wants to receive presence status information.

In one embodiment, contact parameters are set by an initiator of an instant message, such as the first user, so that an alert message is sent to other users, such as the second user, whenever a particular change in the presence status occurs with respect to the first user. Rather than an IM client 320 of the second user detecting a change in the presence status of the first user and playing an auditory alert designated by the second user, the IM client 310 of the first user sends an instant "alert" message to the second user, wherein the alert message includes an attached audio file that is designated by the first party. If the second user is present and available, the alert message is sent to and received at the IM client 320 of the second user. The IM client 320 of the second user then recognizes the alert message and plays the attached audio file, without starting a chat session. Therefore, an initiator of an instant message, such as the first user, can deliver an auditory alert or audio clip of his or her choosing when the first user wants to make his or her change in presence known to another user, such as the second user. Accordingly, the IM client 310 of the first user and the IM client 320 of the second user are distinctly different from conventional IM clients of the prior art.

For example, the first user may specify in his or her contact parameters other users to whom he or she wants to send a personal greeting when the presence state of the first user changes, such as from "Offline" to "Online," for example. Accordingly, an alert message containing an audio file of "Hey, I'm Here" could be sent to the second user and received at the IM client 320 of the second user when the first user initially connects to the instant messaging network 315. After the IM client 320 of the second user receives the alert message, the IM client 320 of the second user will play the audio file, "Hey, I'm Here" to announce the online presence of the first user to the second user.

Additionally, the first user could also specify that an auditory recording of the phrase "I'm Headed Home" should be played on the IM client 320 of the second user, when the first user goes offline. Correspondingly, the first user would set contact parameters for an alert message to be sent to the second user, when the presence status of the first user changes from "Online" to "Offline." The first user may also designate in the contact parameters for alert messages to be sent to more than one recipient; for multiple alert messages to be sent to an individual recipient; or for individual alert messages to feature their own distinct audio files. For example, a first user may designate that a particular audio file should be included in an alert message for his or her spouse and a different audio file should be included in an alert message for a particular friend.

Further in some embodiments, the IM client 320 of the second user includes logic capable of detecting that an instant message is an "alert message." Accordingly, the IM client 320 automatically plays the audio file included in the alert message, upon receiving the alert message. Preferably, the IM client 320 is further configured to not initiate a chat session when the IM client plays an audio file from an alert message.

In other embodiments, if the first user requests to be added to the contact list of the second user, and the request is granted, the audio file designated by the first user may be sent to the second user when the first user's instant messaging address is added to the contact list of the second user. Before the audio file is transmitted to the IM client 320 of the second user, the audio file may be stored on a system of the IM client 310 of the first user. Therefore, after successful transmission, the audio file may be pre-stored and accessed locally by the system used by IM client 320 of the second user whenever the presence change of the first user dictates. Accordingly, an audio file would not have to be sent as part of an instant message. Rather, the arrival of an alert message would trigger the playing of the locally stored audio file by the IM client 320 of the second user.

In response to receiving an alert message, the second user may also have the capability to respond via an auto-response window. For example, after receiving and playing an alert message from the first user, the IM client 320 of the second user may automatically present to the second user an informational window containing several short responses. The second user may then select an individual response by clicking on it via a keyboard or mouse input, for example. By selecting a response, the response is sent to the IM client 310 of the first user. Sample responses include "Can't Chat Now," "Talk with You in Five Minutes," "Contact You Later," etc. The responses constitute visual messages that may be displayed to the first user or audio files that may be sent to the first user in corresponding manners that alert messages may be sent to the second user.

In some embodiments, if the second user is connected to his or her instant messaging network 325 but is operating another application, the IM client 320 of the second user may announce the arrival of the alert message by playing a discrete chime or another subtle sound, for example. Alternatively, the IM client 320 may display a small icon to the second user. Accordingly, the IM client 320 of the second user may be in communication with an operating system or other elements of a computing device executing the IM client 320 to determine if other applications are active. Once the second user notices that an alert message has been received via a chime or icon, for example, the second user may then switch to his or her IM client 320 to listen to the message. Note, in accordance with the present disclosure, other embodiments may also utilize other messaging clients (besides IM clients) that utilize presence information with other messaging formats, such as e-mail, telephone messages, etc.

Figure 4:
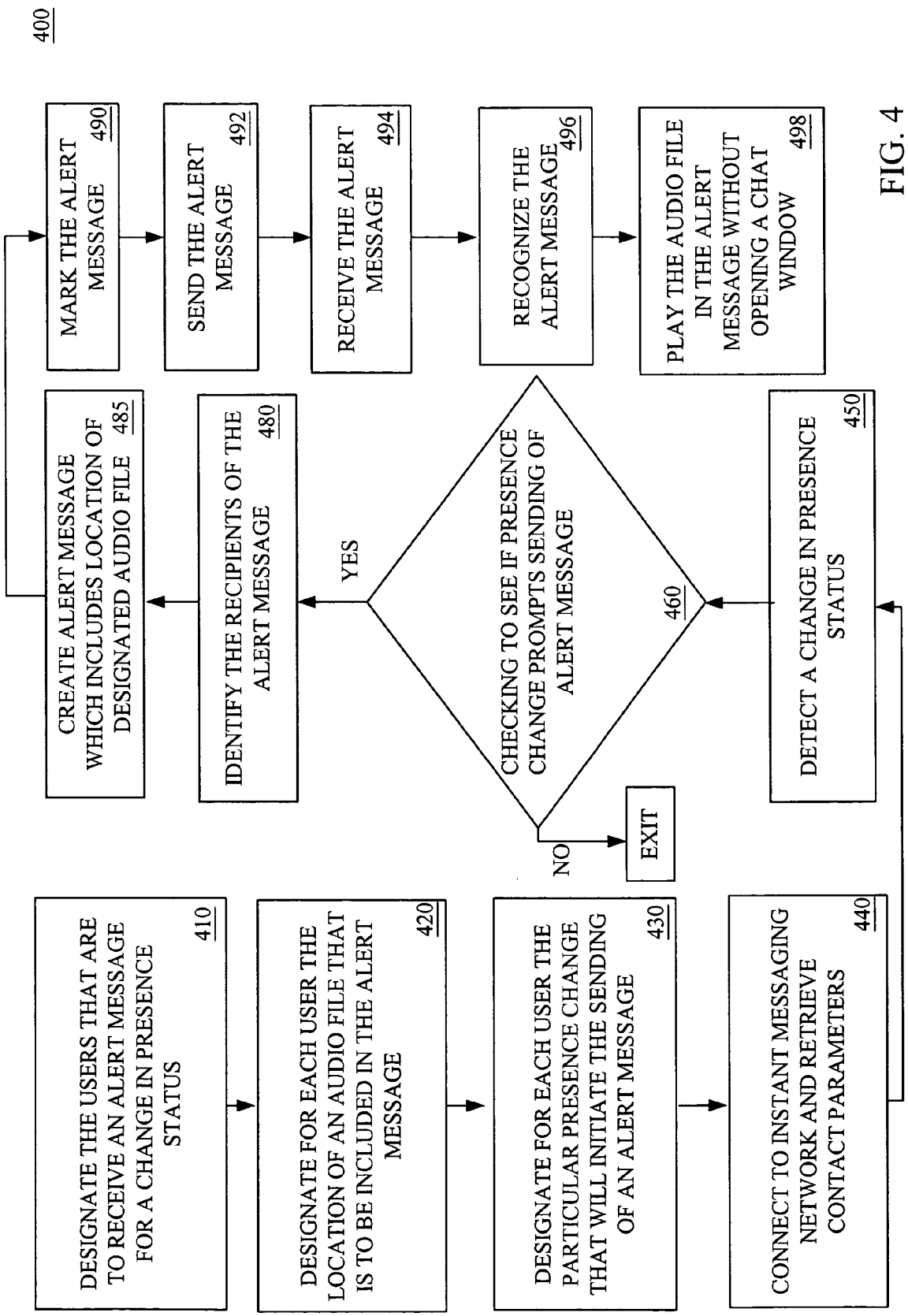
FIG. 4 is a flowchart describing the functionality of an exemplary embodiment of the user-initiated alert system of FIG. 3.

Since the creation of audio files is a fairly uncomplicated task, an audio file can be easily generated on most computers that act as an IM client. Essentially one needs a microphone and a computer. Alternatively, pre-created audio files are readily available on the Internet and most operating systems, so that a user can readily locate an audio file to use in an alert message. The flowcharts of FIG. 4 show the functionality of a representative implementation of the user-initiated alert system 300 according to an exemplary embodiment. It should also be noted that in some alternative implementations the functions noted in the various blocks may occur out of the order depicted in the flowchart of FIG. 4. For example, two blocks shown in succession in FIG. 4 may, in fact, be executed substantially concurrently. Alternatively, the blocks may sometimes be executed in the reverse order depending upon the functionality involved.

As depicted in FIG. 4, the functionality of a representative embodiment of the user-initiated alert system 300 or method 400 may be construed as beginning at block 410. In block 410, a first user designates in contact parameters the other users that are to receive alert messages for particular presence status change(s) by the first user. For example, the first user may designate that an alert message, containing the auditory message: "Hey, Let's Chat," should be sent to the second user when the first user initially connects to the instant messaging network 315. To make such designations, the first user may utilize user interface screens that could include check boxes, drop down boxes, and text boxes, for example, in association with each user identified in the contact parameters.

Accordingly, in block 420, the first user designates for each user previously identified in the contact parameters, the location of an audio file that is to be included in the alert message for that user. The audio file may be stored locally on the IM client 310 of the first user, in one embodiment. In block 430, the first user also designates for each named user in the contact list, the particular change(s) in the presence status of the first user that will initiate the sending of an alert message to that named user. For example, if the first user designates Adam, Brenda, and Chris in his or her contact parameters as intended recipients of alert messages, the first user may specify that he or she wants an alert message to be sent to Adam only when the first user connects to the instant messaging network 315. However, Brenda may be designated to receive an alert message only when the first user disconnects from the instant messaging network 315. Whereas, Chris may be designated to receive alert messages every time the first user connects or disconnects from the network 315. The first user may also specify a particular change in the availability status of the first user that will initiate the sending of an alert message. For example, the first user may specify that an alert message should be sent when the availability of the first user changes from "Present, but Busy" to "Present and Available" or vice versa.

After the first user has made his or her designations in the contact parameters, the IM client of the first user will retrieve the contact parameters in subsequent initial operations of the IM client to access these designations so that the IM client can determine which users should be sent alert messages. Accordingly, in block 440, the IM client 310 of the first user retrieves the contact parameters of the first user. For a closed system (FIG. 1), the contact parameters are retrieved from a storage medium 340 by the IM client 310. However, in the open system of FIG. 2, the contact parameters are retrieved from a storage medium 340 by the IM server 330. The IM server 330 then forwards a copy of the contact parameters to the IM client 310.

In block 450, the IM client 310 of the first user detects a change in the presence state of the first user. Typically, the IM client 310 of the first user notifies an IM server 330 of the change in presence status of the first user. The IM client 310 then checks the contact parameters to see if anyone is designated to receive an alert message for the detected change in the presence status of the first user, as depicted in block 460. Additionally, the IM client 310 identifies the user that is to be the recipient of the alert message from the contact parameters, as depicted in block 480. For example, for a presence status change of "Offline" to "Online," the first user may have designated in his or her contact parameters that an audio sound file of the phrase, "Hey, Let's Chat," should be sent to the second user.

For each change in the presence status of the first user that the IM client 310 detects, the IM client 310 checks the contact parameters of the first user and determines from the contact parameters whether an alert message should be sent. In the example above, the IM client 310 determines that an alert message containing the audio sequence "Hey, Let's Chat" should be sent to the second user for a change in presence from "Offline" to "Online" for the first user.

In block 485, the IM client 310 creates an alert message which includes the location of the audio file, and the IM client 310 addresses the alert message to the desired recipient(s). The alert message is a standard instant message with an attached audio file, except for the fact that the formatting of the alert message also contains a marker or tag that identifies the message as being an alert message, as shown in block 490. For example, the Jabber instant messaging system is based on XML which incorporates user-defined tags. Tags are not predefined in XML. Thus, one may create a new tag or marker and define the tag or marker to suit one's purposes. Accordingly, in one embodiment, the IM client 310 of the first user identifies the instant message to be an "alert message" by adding a marker or tag, such as <alert message>, to the instant message XML formatting. The IM client 310 of the first user then sends the message to the intended recipient(s), as depicted in block 492.

In one embodiment, to send the alert message in a closed instant messaging system (FIG. 1), an IM client 310 of a first user is provided the IP address for the IM client(s) 320 of the other users identified in the contact parameters of the first user. Therefore, an instant message, such as the alert message, is sent directly from the IM client 310 of the first user to recipient IM client(s) 320, such as the second user.

In another embodiment including an open instant messaging system (FIG. 2), however, the IM client 310 of the first user typically does not have the IP address of the receiving IM client(s) 320 of other users identified in the contact parameters of the first user. Accordingly, the IM client 310 of the first user sends instant messages to a local IM server 330. The IM server 330 retrieves the IP address of the recipient from the storage medium 340 and forwards the instant message to the IP address of the receiving IM client 320 of the recipient, such as the second user.

In block 494, the IM client 320 of the recipient receives the alert message. The IM client 320 of the recipient then recognizes from the marker or tag in the received instant message that the message is an alert message, as depicted in block 496. Accordingly, in block 498, the IM client 320 plays the audio file that is included or attached to the instant message, without opening a chat window. Thus, the recipient at the IM client 320 hears an alert message, such as "Hey, Let's Chat!" from the first user to notify the recipient that the first user is now online. These audio alerts will preferably be in addition to any usual visual change in presence or availability indicators.

Other alternative embodiments may include additional steps. For example, if the first user requests to be added to the contact list of the second user, and the request is granted, the audio file designated by the first user may be sent to the second user when the first user's instant messaging address is provided to the contact list of the second user. Typically, when the second user agrees to accept another user, such as the first user, onto his or her contact list, the instant messaging nickname or address of the first user is provided to the second user. However, in this alternative embodiment, an audio file designated by the first user is also sent from the IM client 310. Therefore, the audio file may be pre-stored and accessed locally by the system used by IM client 320 of the second user whenever the presence of the first user dictates. Accordingly, an audio file would not have to be sent as part of each alert message. Rather, the arrival of an alert message would trigger the playing of the locally stored audio file by the IM client 320 of the second user.

The IM client 310, 320 of one embodiment can be implemented in software, firmware, hardware, or a combination thereof. In one embodiment, the IM client 310, 320 is implemented in software, as an executable program, and is executed by a special or general-purpose digital computer, such as a personal computer, workstation, minicomputer, or mainframe computer. An example of a general-purpose computer that can implement the user-initiated alert system of one embodiment is shown in FIG. 5.

Figure 5:
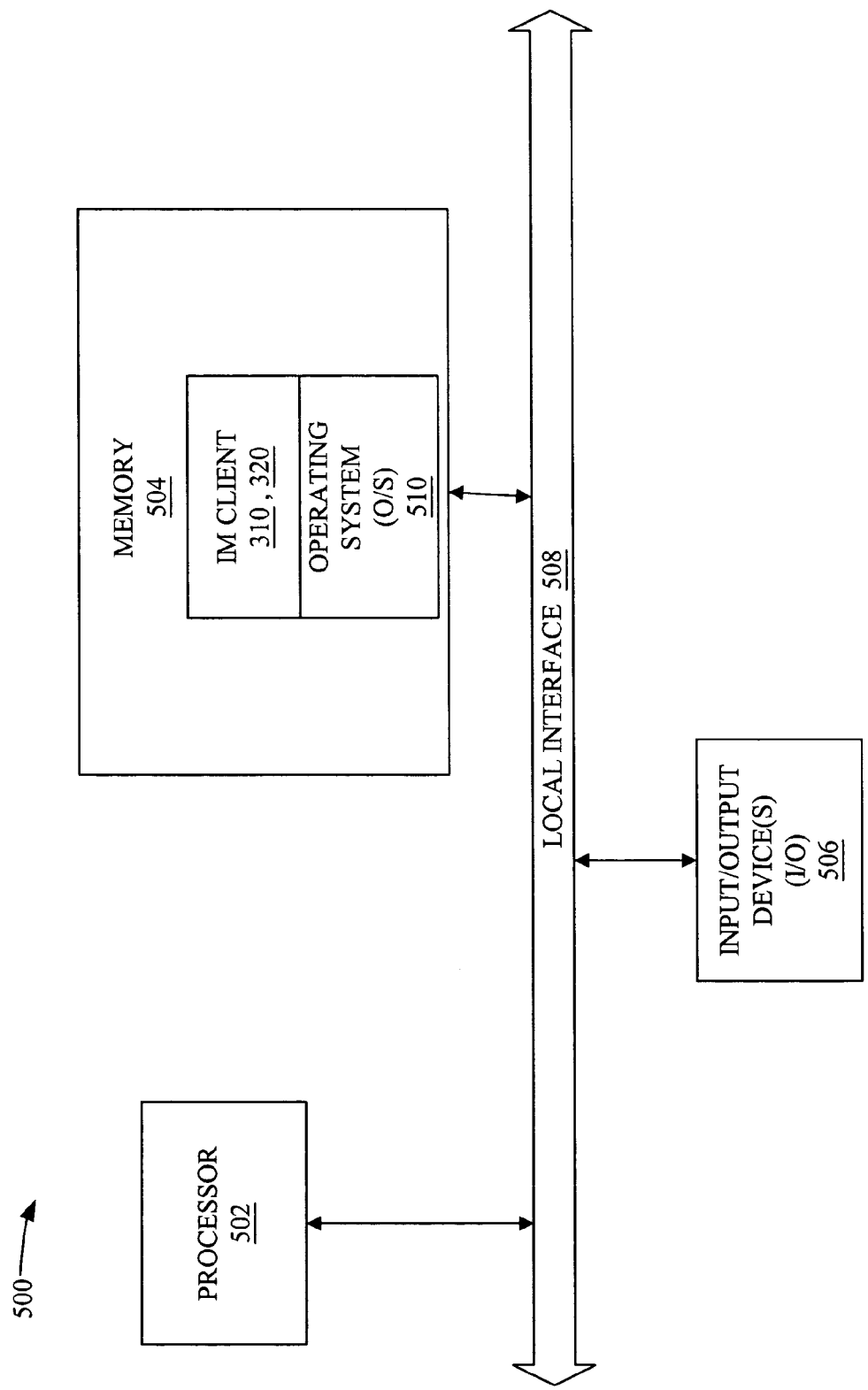
FIG. 5 is a block diagram of an exemplary embodiment of a messaging client, such as the IM client shown in FIG. 3.

Generally, in terms of hardware architecture, as shown in FIG. 5, the computer 500 includes a processor 502, memory 504, and one or more input and/or output (I/O) devices 506 (or peripherals) that are communicatively coupled via a local interface 508. The local interface 508 can be, for example but not limited to, one or more buses or other wired or wireless connections, as is known in the art. The local interface 508 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 502 may be a hardware device for executing software that can be stored in memory 504. The processor 502 can be any custom made or commercially available processor, a central processing unit (CPU) or an auxiliary processor among several processors associated with the computer 500, and a semiconductor based microprocessor (in the form of a microchip) or a macroprocessor.

The memory 504 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 504 may incorporate electronic, magnetic, optical, and/or other types of storage media. Note that the memory 504 can have a distributed architecture, where various components are situated remote from one another, but can be accessed by the processor 502.

The software in memory 504 may include one or more separate programs, each of which comprises an ordered listing of executable instructions for implementing logical functions. In the example of FIG. 5, the software in the memory 504 includes the IM client 310, 320 and an operating system (O/S) 510. The operating system 510 essentially controls the execution of other computer programs, and provides scheduling, input-output control, file and data management, memory management, and communication control and related services.

The IM client 310, 320 may be a source program, executable program (object code), script, or any other entity comprising a set of instructions to be performed. If the IM client 310, 320 is a source program, then the program needs to be translated via a compiler, assembler, interpreter, or the like, which may or may not be included within the memory 504, so as to operate properly in connection with the O/S 510. Furthermore, the IM client 310, 320 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 506 may include input devices, for example but not limited to, a keyboard, mouse, scanner, digital camera, multi-function device, digital sender, microphone, etc. Furthermore, the I/O devices 506 may also include output devices, for example but not limited to, a printer, display, etc. Finally, the I/O devices 506 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 500 is a PC, workstation, or the like, the software in the memory 504 may further include a basic input output system (BIOS) (omitted for simplicity). The BIOS is a set of essential software routines that initialize and test hardware at startup, start the O/S 510, and support the transfer of data among the hardware devices. The BIOS is stored in ROM so that the BIOS can be executed when the computer 500 is activated.

When the computer 500 is in operation, the processor 502 is configured to execute software stored within the memory 504, to communicate data to and from the memory 504, and to generally control operations of the computer 500 pursuant to the software. The IM client 310, 320 and the O/S 510, in whole or in part, but typically the latter, are read by the processor 502, perhaps buffered within the processor 502, and then executed.

When the IM client 310, 320 is implemented in software, as is shown in FIG. 4, it should be noted that the IM client 310, 320 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The IM client 310, 320 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the IM client 310, 320 is implemented in hardware, the IM client 310, 320 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
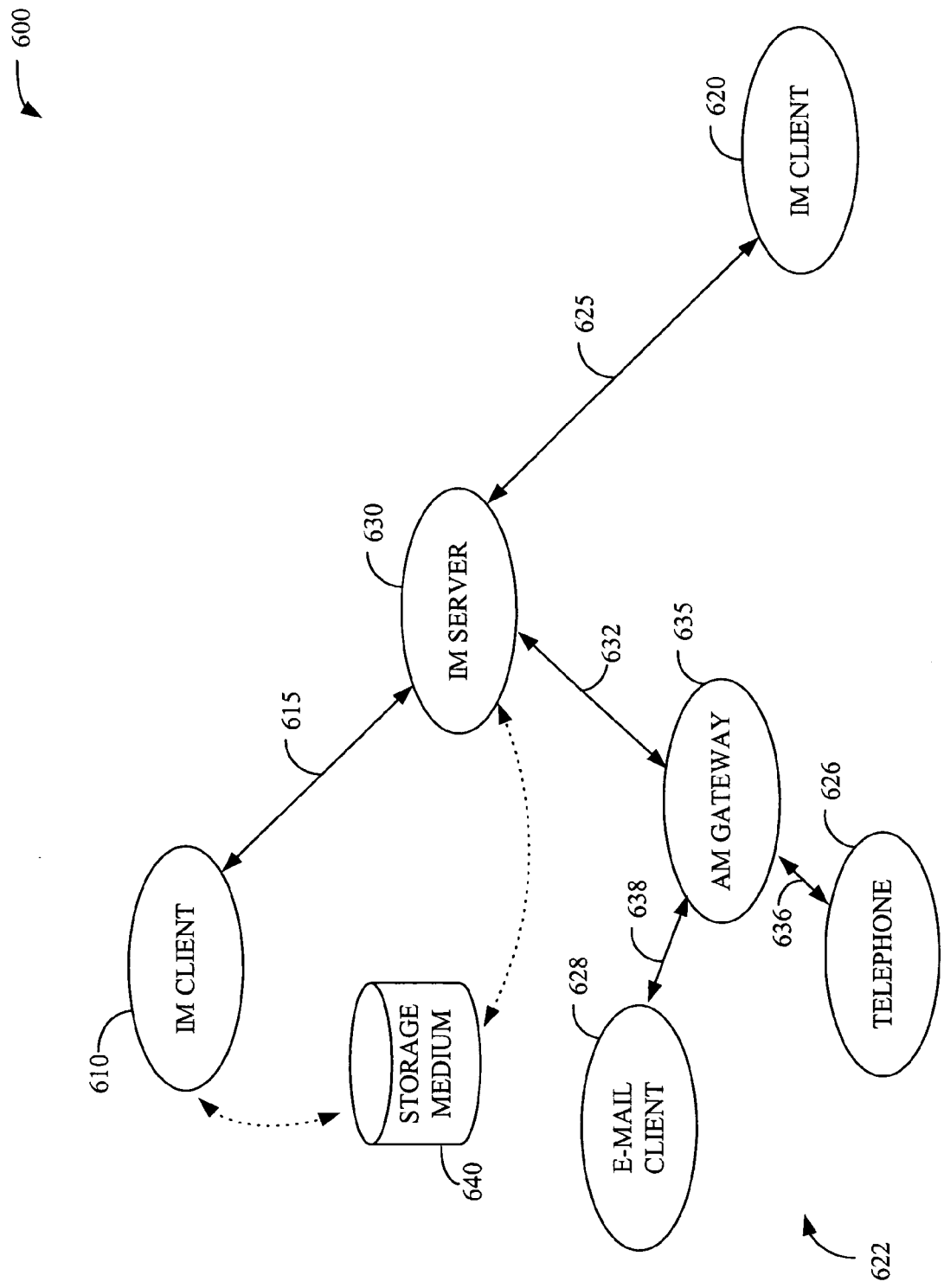
FIG. 6 is a block diagram of a user-initiated alert system according to one exemplary embodiment for sending alert messages to backup addresses in the event that the intended recipient of the alert message is not accessible in real time.

Depicted in FIG. 6 is a representative embodiment, among others, of an alternative embodiment of the user-initiated alert system 600 of the present disclosure. The user-initiated alert system 600 includes an instant messaging (IM) client 610 of a first user, wherein the IM client 610 is adapted to transmit an alert message when a particular presence status change occurs with regard to the first user. The system also includes an IM client 620 of a second user, wherein the client 620 is adapted to receive and play the alert messages it receives from other users, such as the first user. Note, in accordance with the present disclosure, other embodiments may also utilize other messaging clients (besides IM clients) that utilize presence information with other messaging formats, such as e-mail, telephone messages, short message service, etc., and therefore, the present disclosure is not intended to be limited to communications involving instant messages.

Referring back to FIG. 6, one embodiment includes an alternative media client (AM client) 622 of the second user (e.g., an e-mail client 628, a wireless/wireline telephone 628, etc.) this is adapted to receive alert messages in a native format of an alternate communication network (e.g., telephone network 636, e-mail network 638, etc.) from an alternative media gateway (AM gateway) 635. For example, in FIG. 6, if an alert message is unable to be delivered to the IM client 620 of the second user, the IM server 630 could relay an alert message over a data network 632 to the AM gateway 635 that formats the alert message to an audio file format (e.g., a WAV file, speech format via text-to-speech converter, etc.) that is played over a wireline or wireless telephone network 636 to a telephone 626 of the second user, for some embodiments. Alternatively, in some embodiments, the AM gateway 635 could format the alert message into to an e-mail message that is transmitted to an e-mail client 628 of the second user over an e-mail network 638. As described hereinbefore, the IM client 610 of the first user acquires objective information that is relevant to determining when to send an alert message.

Each IM client 610, 620 communicates with and receives presence status information from an IM server 630. The IM server 630 may be, among others, a single IM server 105 of FIG. 1 or a local IM server, such as a Jabber Server 215 of FIG. 2. The IM server 630 monitors the presence information of the IM client 610 of the first user and notifies the IM client 610 of the presence status information of other IM clients 620 and their associated users. Accordingly, a user sets contact parameters on the type of presence information that the user wants to receive from the IM server 630.

For instance, the first user may designate the contact parameters in a contact list (or buddy list), for example. Within the contact parameters, the first user names the second user as a person that the first user wants to monitor. The contact parameters in the contact list are then stored in a storage medium 640 that is accessible by the IM client 610 of the first user or the IM server 630. Other information may also be contained in the contact parameters such as the instant messaging addresses of the people identified in the contact list. In accordance with the present disclosure, alternative messaging or backup addresses may also be contained in the contact parameters for the people identified in the contact list. For some embodiments, an alternative messaging address (e.g., a telephone number, an e-mail address, etc.) is used if a message addressed to an instant messaging address is unable to be delivered (e.g., a user is not present and/or available on the instant messaging network) or confirmation of delivery of the alert message is not possible.

In one preferred embodiment of the disclosure, contact parameters are set by an initiator of an instant message, such as the first user, so that an alert message is sent to other users, such as the second user, whenever a particular change in the presence status occurs with respect to the first user. Rather than an IM client 620 of the second user detecting a change in the presence status of the first user and playing an auditory alert designated by the second user, the IM client 610 of the first user sends an instant "alert" message to the second user, wherein the alert message includes an attached audio file that is designated by the first party. If the second user is present and available, the alert message is sent to and received at the IM client 620 of the second user. The IM client 620 of the second user then recognizes the alert message and plays the attached audio file, without starting a chat session.

If the second user is not present and available or if delivery of the alert message cannot be confirmed, the alert message is relayed to an alternative messaging address specified in the contact parameters for the second user. For example, if the IM client 610 of the first user does not receive an acknowledged receipt of the alert message by the IM client 620 of the second user, the IM client 610 of the first user resends the alert message to the AM gateway 635 with an alternative messaging address for the second user. A variety of approaches may be used to detect receipt of an alert message and to respond by confirming or acknowledging receipt of an alert message. In some embodiments, for example, an IM client may acknowledge receipt of any alert message that is received by the IM client. In some embodiments, an IM client can acknowledge receipt of an alert message after an event is detected by a graphical window that displays the alert message, such as an operation by a user to resize the window, to close the window, to move the window, to bring the window into focus, to press a button intended for the purpose of acknowledging receipt, etc.

The AM gateway 635 converts the formatting of the alert message to correspond to the media type of the alternative messaging address. The newly formatted alert message is then transmitted to the AM client 622 of the second user identified by the alternative messaging address, such as a telephone number. For example, if the alert message originally contained textual information and an audio recording, the textual information can be converted to speech using text-to-speech technology. Then, the speech and audio recording portions can be played over a telephone network to a telephone device 626 of the second user.

Further, more than one alternative messaging address (e.g., another instant messaging address, telephone number, e-mail address, etc.) can be specified for a particular user. For example, a user can specify a telephone number as his or her first alternative messaging or backup address. However, if the user is not available at the first alternative messaging address (e.g., a telephone number, in addition to the user's instant messaging address), an alert message can be attempted to be relayed to a second alternative messaging address, such as an e-mail address. Therefore, the IM client 610 of the first user provides the AM gateway 635 with the second alternative messaging address for the second user. The AM gateway 635 converts the formatting of the alert message to correspond to the media type of the alternative messaging address. The newly formatted alert message is then transmitted to the AM client 622 of the second user identified by the alternative messaging address, such as an e-mail address. For example, if the alert message originally contained textual information and an audio recording, the alert message can be converted into an e-mail format that contains corresponding textual information and voice recording (in a WAV format, for example). Then, the newly formatted alert message can be transmitted to an e-mail client 628 associated with the second alternative messaging address.

Figure 7:
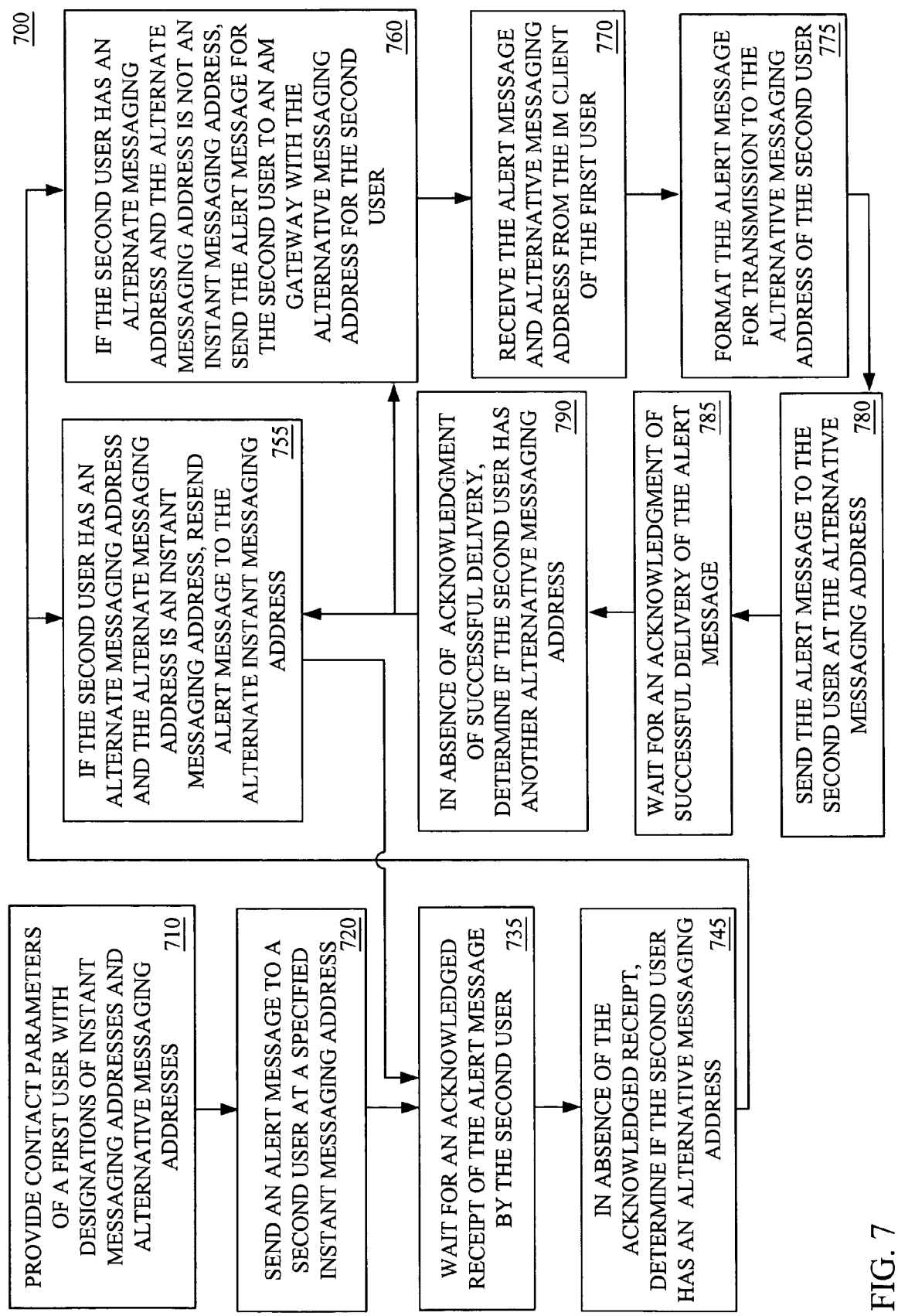
FIG. 7 is a flowchart describing the functionality of an exemplary embodiment of the user-initiated alert system of FIG. 6.

Next, as depicted in FIG. 7, the functionality of one representative embodiment, among others, of the user-initiated alert system 600 or method 700 may be construed as beginning at block 710. In block 710, contact parameters of a first user are provided. The contact parameters of the first user include designations of other users that are to receive alert messages from the first user for particular presence status change(s) by the first user. In particular, the designations include instant messaging addresses for addressing alert messages to the other users and may also contain alternate messaging address(es) for sending alert messages if respective users are not available at specified instant messaging addresses. To make such designations, the first user may utilize user interface screens that could include check boxes, drop down boxes, and text boxes, for example, in association with each user identified in the contact parameters.

Accordingly, in block 720, the IM client 610 of the first user sends the alert message to the second user at the specified instant messaging address. The IM client 610 of the first user then waits (735) for an acknowledged receipt of the alert message by the second user (via an IM client 620 of the second user). Absence of the acknowledged receipt being received by the IM client 610 of the first user for a set time period results in a timeout event in the IM client 610 of the first user. Therefore, in absence of the acknowledged receipt and the occurrence of the timeout event, the IM client 610 of the first user checks the contact parameters to determine (745) if the second user has a designated alternative messaging address. If the second user has a designated alternate messaging address and the alternate messaging address is an instant messaging address, the IM client 610 of the first user resends (755) the alert message to the designate alternate instant messaging address and waits (735) for acknowledged receipt of the alert message. Otherwise, if the second user has a designated alternate messaging address and the alternate messaging address is not an instant messaging address, the IM client 610 of the first user sends (760) the alert message for the second user to an AM gateway 635 with the identification of the alternative messaging address for the second user. For example, in some embodiments, a network address for the AM gateway 635 is stored in the contact parameters. The AM gateway 635 is capable of receiving the alert message and a destination messaging address (e.g., e-mail address, telephone number, etc.) and delivering the alert message in a native messaging format that is associated with the destination messaging address. For example, the AM gateway 635, in some embodiments, is capable of receiving the alert message and a destination telephone number; initiating a telephone call to the destination number; and delivering the alert message via text-to-speech technology over either a wireless network or a wireline network.

Therefore, the AM gateway 635 receives (770) the alert message and alternative messaging address from the IM client 610 of the first user and formats (775) the alert message for transmission to the alternative messaging address of the second user. Then, the AM gateway 635 sends or transmits (780) the alert message to the second user at the alternative messaging address. Accordingly, in block 785, the IM client 610 of the first user waits for an acknowledgment from the AM gateway 635 of successful delivery of the alert message to the alternative messaging address. For example, after successful delivery of an alert message to an e-mail address, the AM gateway 635 receives an acknowledgement receipt from the e-mail client 628, and the AM gateway 635 relays the acknowledgement of successful delivery to the IM client 610 of the first user. Correspondingly, after successful delivery of an alert message to a telephone device, the AM gateway 635 recognizes the successful delivery by detecting a completed telephone call to the second user and notifies the IM 610 client of the first user of the successful delivery.

Therefore, in absence of the acknowledgment of successful delivery (via the IM client of the second user and/or IM server), the IM client 610 of the first user checks the contact parameters to determine (790) if the second user has another designated alternative messaging address. If the second user has another designated alternate messaging address, the IM client 610 of the first user resends the alert message to the designated alternate messaging address, as previously described in steps 755 and 760.

It should be emphasized that the above-described embodiments of the present disclosure, particularly, any "preferred" or "exemplary" embodiments, are merely possible examples of implementations, merely set forth for a clear understanding of the principles of the disclosure. Many variations and modifications may be made to the above-described embodiments of the disclosure without departing substantially from the spirit and principles of the disclosure. For example, the IM client that receives an alert message may have the capability of blocking the playing of the audio file in the alert message or the displaying of auto-responses. Also, in some embodiments of the user-initiated alert system, a chat window may be opened along with the playing of the alert message to prompt the recipient to begin a chat session. For example, in addition to a personal computer, the IM client may also include mobile devices, such as, among others, a personal digital assistant, a cellular phone, or a pager. All such modifications and variations are intended to be included herein within the scope of this disclosure.

Therefore, having thus described the invention, at least the following is claimed:

1. A method for re-sending a message, originally intended for receipt at an instant messaging client, to at least one alternate address, comprising:

sending an instant message from a first messaging user to a second messaging user, the instant message containing a network presence change of the first messaging user;

waiting for acknowledgement of receipt of the instant message by the second messaging user; and in the absence of an acknowledged receipt of the instant message, automatically re-sending, from an instant messaging client that initially sent the instant message, content of the instant message to the second messaging user at at least one alternate address for the second messaging user, wherein receipt of the instant message by the second messaging user is detected by recognizing an event associated with a graphical window displaying the instant message, the event comprising at least one of an operation by the second messaging user to resize of the graphical window, an operation by the second messaging user to close the graphical window, an operation by the second messaging user to move the graphical window, and an operation by the second messaging user to bring the graphical window into focus, wherein the instant messaging client is further configured to receive instant messages containing network presence changes from other users, the instant messaging client configured to present the second messaging user an option of responding to a received instant message containing a network presence change and wherein the instant messaging client is configured to play or display contents of the instant message containing the network presence change without opening a chat window.

2. The method according to claim 1, wherein automatically re-sending content of the instant message is in response to a timeout in waiting for a message receipt acknowledgement.

3. The method according to claim 1, wherein automatically re-sending content of the instant message includes a determination of at least one alternate address for the second messaging user by the instant messaging client that initially sent the instant message.

4. The method according to claim 3, wherein the alternate address is an instant messaging address.

5. The method according to claim 3, wherein the alternate address is an e-mail address.

6. The method according to claim 3, wherein the alternate address is a telephone number.

7. A machine-readable computer drive storage medium, having stored thereon data and instructions, which, when executed perform:

sending an instant message from a first messaging user to a second messaging user, the instant message containing a network presence change of the first messaging user;

waiting for acknowledgement of receipt of the instant message by the second messaging user; and in the absence of an acknowledged receipt of the instant message, automatically re-sending, from an instant messaging client that initially sent the instant message, content of the instant message to the second messaging user at at least one alternate address for the second messaging user, wherein receipt of the instant message by the second messaging user is detected by recognizing an event associated with a graphical window displaying the instant message, the event comprising at least one of an operation by the second messaging user to resize of the graphical window, an operation by the second messaging user to close the graphical window, an operation by the second messaging user to move the graphical window, and an operation by the second messaging user to bring the graphical window into focus, wherein the instant messaging client is further configured to receive instant messages containing network presence changes from other users, the instant messaging client configured to present the second messaging user an option of responding to a received instant message containing a network presence change and wherein the instant messaging client is configured to play or display contents of the instant message containing the network presence change without opening a chat window.

8. The machine-readable computer drive storage medium according to claim 7, wherein re-sending content of the instant message is in response to a timeout in waiting for a message receipt acknowledgement.

9. The machine-readable computer drive storage medium according to claim 7, wherein re-sending content of the instant message includes a determination of alternate address(es) for the second messaging user by the instant messaging client that initially sent the instant message.

10. The machine-readable computer drive storage medium according to claim 7, wherein the alternate address is an instant messaging address.

11. The machine-readable computer drive storage medium according to claim 7, wherein the alternate address is an e-mail address.

12. The machine-readable computer drive storage medium according to claim 7, wherein the alternate address is a telephone number.

13. A system for re-sending an instant message, originally intended for receipt at an instant messaging client, to at least one alternate address, comprising:

a messaging server for handling communications between at least a first messaging client sending an instant message and a second messaging client that is an intended recipient of the instant message, the instant message containing a network presence change of the first messaging client, the second messaging client configured to display the instant message within a graphical window of the second messaging client, the second messaging client further configured to detect an event associated with the graphical window indicative of receipt of the instant message, the event comprising at least one of an operation by a user of the second messaging client to resize of the graphical window, an operation by the user to close the graphical window, an operation by the user to move the graphical window, and an operation by the user to bring the graphical window into focus, the second messaging client further configured to send an acknowledgement of receipt of the instant message if the event is detected; and a gateway between the messaging server and an alternate communication network, wherein in the absence of an acknowledged receipt of the instant message from the second messaging client, the gateway receives identification of at least one alternate address from the instant messaging client that initially sent the instant message and the gateway then re-sends content of the instant message to the intended recipient at the at least one alternate address, wherein the second messaging client is further configured to present the user an option of responding to a received instant message containing a network presence change and wherein the second messaging client is configured to play or display contents of the instant message containing the network presence change without opening a chat window.

14. The system of claim 13, wherein the gateway is a telephony network gateway capable of receiving a message and a destination telephone number and initiating a telephone call to the destination number.

15. The system of claim 14, wherein the telephony network gateway is capable of delivering the message via text-to-speech technology.

16. The system of claim 13, wherein the gateway is an e-mail gateway capable of receiving a message and a destination e-mail address and sending an e-mail containing the message to the destination e-mail address.

17. The system of claim 13, wherein alternate addresses for the intended recipient are stored locally with the first messaging client.

18. The system of claim 13, wherein alternate addresses for the intended recipient are accessed over a data network.

19. The system of claim 13, wherein at least one of the messaging clients communicates via a wireline network.

20. The system of claim 13, wherein at least one of the messaging clients communicates via a wireless network.

* * * * *